Patented Nov. 30, 1948

2,455,095

UNITED STATES PATENT OFFICE 2,455,095

4-AMINO-1,8-NAPHTHALIC IMIDE DISULFONIC ACIDS

Mario Scalera and Warren S. Forster, Somerville, N. J., assignors to American Cyanamid Company, New York, N. Y., a corporation of Maine No Drawing. Application February 20, 1945, Serial No. 578,956

7 Claims. (Cl. 260—281)

This invention relates to water-soluble dyestuffs capable of dyeing basic fibers and containing a naphthalimide group.

In the past a number of dyestuffs have been prepared which are 3-monosulfonic acids of 4-amino-1,8-naphthalimides. These dyestuffs were produced for dyeing wool and other basic fibers and were in general of a very greenish yellow shade showing strong fluorescence under ultraviolet light. The monosulfonic acids, however, have been relatively unsuccessful in practice because of a number of shortcomings. The dyes do not exhaust well on wool and most of them give dyeings not fast to salt water spotting.

According to the present invention we have found that 3-x-disulfonic acids of 4-amino-1,8-naphthalamides also dye wool and other basic fibers very brilliant yellow with a strong fluorescence. At the same time, these dyestuffs when compared to the corresponding monosulfonated dyestuffs of prior art show much better exhaustion, a greatly improved tinctorial strength in many cases double or even greater, a marked improvement in fastness to salt water spotting, and a shift in shade from greenish yellows to warm golden yellows. The reason for these important improvements in characteristics have not been determined as yet and the invention is not intended to be limited to any particular theory of action. It is, however, noted that the improved characteristics depend on the presence of two sulfonic groups. Without, therefore, wishing to limit the invention to any theory, it seems probable that the improvement is due to the presence of the second sulfonic group, as considerable changes in other portions of the molecule do not appear to affect materially the improved characteristics.

The dyes of the present invention may be represented by the following formula:

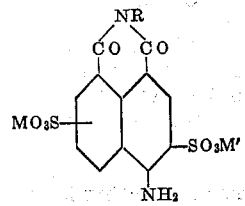

where R stands for an alkyl, aralkyl, hydroaryl or aryl group of the benzene or naphthalene series and M and M' stand for cations.

As brought out above, in spite of the wide range of groups which can be attached to the imide nitrogen, the improved characteristics of the disulfonic acids are retained and the dyestuffs in general dye wool brilliant yellow shades with strong green fluorescence under ultraviolet light. They are, therefore, well suited for fabrics to be used in blackouts and for the dyeing of theater carpets to be illuminated by ultraviolet light. The dyestuffs themselves produce excellent colors and may be used where the brilliant yellow is desired regardless of fluorescence characteristics and it is an advantage of the present invention that dyestuffs of such attractive shades and brilliance are also strongly fluorescent.

The group R on the imide nitrogen may be an alkyl group, such as for example methyl, ethyl, butyl, amyl and the like. It may be the residue of an amine acid such as glycine, may have one or more hydroxyl groups such as dyestuffs derived from various alkylol amines, and the like. The group is in no sense limited to aliphatic radicals and on the contrary aralkyl radicals such as benzyl and hydroaromatic radicals of the benzene and naphthalene series such as cyclohexyl, decahydronaphthyl and the like may be employed. Aromatic radicals such as phenyl, tolyl, naphthyl and the like may also be substituents of the imide group.

The present invention is not intended to be limited to any particular method of preparation and any suitable procedure may be employed. However, we have found that most of the dyestuffs may be readily prepared by sulfonating 4-amino-naphthalic anhydride with oleum to produce a disulfonic acid and then reacting this compound with the desired primary amine at elevated temperature in aqueous medium.

The dyestuffs are soluble in water and are most commonly used in the form of their alkali metal salts.

The invention will be illustrated in conjunction with the following examples which are illustrative only, the parts being by weight.

Example 1

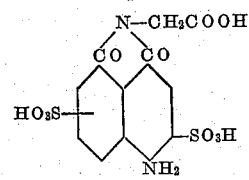

6 parts of 4-amino-1,8-naphthalic anhydride are stirred with 37 parts of 20% oleum at 95°–100° for about one hour. The mixture is drowned in a large amount of water, clarified, and sodium chloride is added to a concentration of 15%. This precipitates the disulfonic acid as its disodium salt, a brilliant orange solid, which is filtered off, washed with salt brine and dried. 10 parts of this salt are mixed with 18 parts of glycine, 2.5 parts of sodium hydroxide and 140 parts of water. The reaction mixture is heated for a number of hours under reflux. As the reaction proceeds, the mixture assumes a clear amber color with a greenish fluorescence, and after completion of the reaction, the mixture is clarified, acidified with mineral acid, boiled, and the sodium salt of the dyestuff precipitated out with salt.

The dyestuff is a brilliant orange solid which dyes wool a beautiful greenish yellow, faster to salt water spotting, redder in shade, and dyeing much stronger than the corresponding monosulfonated derivative.

*Example 2*

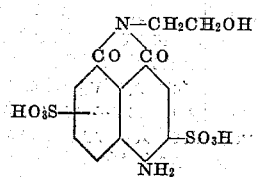

5 parts of the disodium salt of 4-amino-1,8-naphthalic anhydride disulfonic acid (prepared as described in Example 1) are mixed with 14 parts of monoethanolamine and 48 parts of water and boiled under reflux for a number of hours. As the reaction proceeds, the solution assumes a clear amber color with greenish fluorescence. After completion of the reaction, the sodium salt of the dyestuff is salted out at boiling temperature. After cooling, the solid is filtered, washed free of excess ethanolamine with dilute hydrochloric acid, then washed with dilute caustic soda and finally with brine.

The product is a bright orange solid, which dyes wool a brilliant yellow, redder in shade, superior in fastness to salt water spotting, and dyeing twice as strong as the corresponding monosulfonated derivative.

*Example 3*

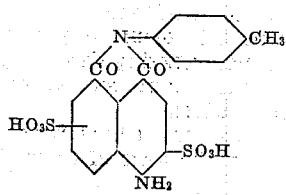

5 parts of the disodium salt of the 4-amino-1,8-naphthalic anhydride disulfonic acid, prepared as described in Example 1, are mixed with 5 parts of p-toluidine and 120 parts of water and boiled under reflux for several hours. An amber solution forms with strong greenish fluorescence. After the reaction is complete, the excess p-toluidine is removed by steam distillation. The solution is then clarified, heated to boiling, and the sodium salt of the dyestuff salted out. The bright yellow dyestuff dyes wool a brillian golden yellow. This product is much redder in shade, superior in fastness to salt water spotting, exhausts more completely, and dyes over four times as strong as the corresponding monosulfonated derivative.

*Example 4*

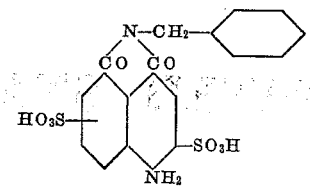

5 parts of the disodium salt of the 4-amino-1,8-naphthalic anhydride disulfonic acid, prepared as described in Example 1, are mixed with 5 parts of benzylamine and 100 parts of water and boiled under reflux for some hours. A pale orange solution results, which darkens slightly as heating progresses. The excess benzylamine is removed by steam distillation. The solution is then clarified, heated to boiling, and the sodium salt of the dyestuff salted out.

The product is a brilliant orange solid which dyes wool in a shade of yellow much redder than the corresponding monosulfonated derivative, and much superior in fastness to spotting with salt water. The product also exhausts much better than the corresponding monosulfonated derivative, and is almost twice as strong tinctorially.

*Example 5*

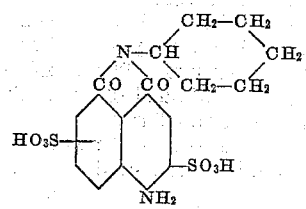

5 parts of the disodium salt of the 4-amino-1,8-naphthalic anhydride disulfonic acid, prepared as described in Example 1, are mixed with 8.3 parts of cyclohexylamine and 100 parts of water and boiled under reflux several hours. A pale amber solution results. After reaction is complete, the excess cyclohexylamine is removed by steam distillation. The solution is then clarified, heated to boiling and the sodium salt of the dyestuff salted out. The dyestuff is an intensely greenish yellow solid. It dyes wool a greenish yellow, redder in shade and faster to salt water spotting, much superior in exhaustion and dyeing almost twice as strong as the corresponding monosulfonated derivative.

*Example 6*

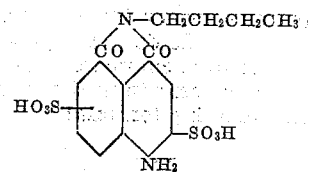

5 parts of the disodium salt of the 4-amino-1,8-naphthalic anhydride disulfonic acid, prepared as described in Example 1, are mixed with 5 parts of n-butylamine and 100 parts of water and boiled under reflux for a number of hours. A clear orange solution is obtained which grows redder and darker as heating is continued. The excess butylamine is steam-distilled out and the solution clarified. The sodium salt of the dyestuff is salted out from the boiling solution. The dyestuff is a brilliant yellow, somewhat redder than the corresponding cyclohexyl imide described in Example 5. It dyes wool greenish yellow, redder in shade, faster to salt water spotting, much superior in exhaustion and dyeing almost twice as strong as the corresponding monosulfonated derivative.

*Example 7*

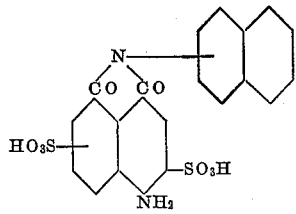

5 parts of the disodium salt of the 4-amino-1,8-naphthalic anhydride disulfonic acid, prepared as described in Example 1, are mixed with 5 parts of beta naphthylamine and 100 parts of water and boiled for a number of hours under reflux. Solution of the solid material takes place as heating progresses and when the reaction is complete a translucent orange solution is obtained. The excess beta naphthylamine is removed by steam. The solution is clarified, another 100 parts of water are added and the clear amber solution is salted at the boil to precipitate the sodium salt of the dyestuff. The dyestuff is a yellow-brown solid. It dyes wool a bright greenish yellow, redder in shade, faster to salt water spotting, much superior in exhaustion, and dyeing more than twice as strong when compared to the corresponding monosulfonated derivative.

In the examples processes are described which produce products in which the major portion of the dyestuff is di-sulfonated. It is not readily feasible by the processes described to produce a product which is 100% free of monosulfo products. These are, however, present only as minor impurities.

This application is in part a continuation of our prior copending application Serial No. 457,519, filed September 5, 1942, now abandoned.

We claim:

1. New compounds of the following formula:

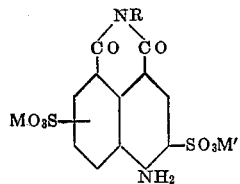

in which R is a radical selected from the group consisting of alkyl radicals, hydroxyalkyl radicals, carboxyalkyl radicals, aralkyl radicals and radicals of the mono and dinuclear hydroaromatic and aromatic series, and M and M' stand for cations.

2. New compounds of the following formula:

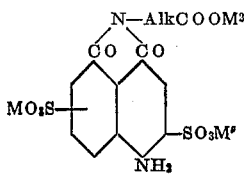

in which Alk stands for alkylene and M, M' and $M^2$ stand for cations.

3. New compounds of the following formula:

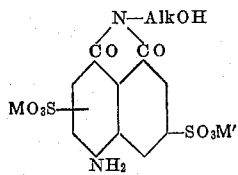

in which Alk stands for alkylene and M and M' stand for cations.

4. New compounds of the following formula:

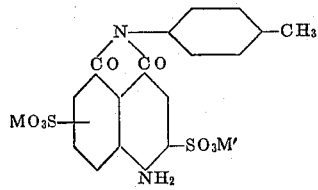

where M and M' stand for cations.

5. New compounds of the following formula:

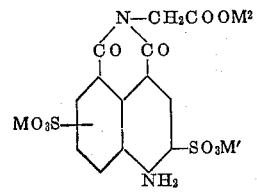

in which M, M' and $M^2$ stand for cations.

6. New compounds of the following formula:

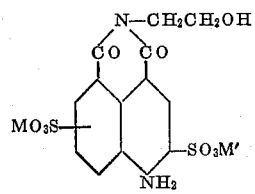

in which M and M' stand for cations.

7. Compounds according to claim 1 in which R is a mononuclear aryl group.

MARIO SCALERA.
WARREN S. FORSTER.

REFERENCES CITED

The following references are of record in the file of this patent:

UNITED STATES PATENTS

| Number | Name | Date |
|---|---|---|
| 1,796,011 | Eckert | Mar. 10, 1931 |
| 1,796,012 | Eckert | Mar. 10, 1931 |
| 1,984,110 | Bodner et al. | Dec. 11, 1934 |
| 2,096,295 | Eckert et al. | Oct. 19, 1937 |

FOREIGN PATENTS

| Number | Country | Date |
|---|---|---|
| 150,195 | Switzerland | Jan. 2, 1932 |